United States Patent
Akuzawa et al.

(10) Patent No.: US 9,796,497 B2
(45) Date of Patent: Oct. 24, 2017

(54) STRETCHED AND FOAMED PLASTIC FORMED BODY HAVING APPEARANCE OF A METAL COLOR

(71) Applicant: TOYO SEIKAN GROUP HOLDINGS, LTD., Tokyo (JP)

(72) Inventors: Norio Akuzawa, Kanagawa (JP); Kentarou Ichikawa, Kanagawa (JP); Nobuhisa Koiso, kanagawa (JP); Tetsuro Nomura, Kanagawa (JP); Hiroki Iino, Kanagawa (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 477 days.

(21) Appl. No.: 14/386,929

(22) PCT Filed: Mar. 4, 2013

(86) PCT No.: PCT/JP2013/055832
§ 371 (c)(1),
(2) Date: Sep. 22, 2014

(87) PCT Pub. No.: WO2013/146109
PCT Pub. Date: Oct. 3, 2013

(65) Prior Publication Data
US 2015/0044406 A1    Feb. 12, 2015

(30) Foreign Application Priority Data

Mar. 26, 2012 (JP) ................................. 2012-069581
Oct. 1, 2012 (JP) ................................. 2012-219310

(51) Int. Cl.
*B65D 1/02* (2006.01)
*B29C 49/06* (2006.01)
(Continued)

(52) U.S. Cl.
CPC ............ *B65D 1/0215* (2013.01); *B29C 49/06* (2013.01); *B29C 49/08* (2013.01); *B65D 1/0207* (2013.01);
(Continued)

(58) Field of Classification Search
CPC ........... B29B 2911/14013; B29C 49/06; B29C 49/08; B29K 2105/04; B29K 2995/0025;
(Continued)

(56) References Cited

U.S. PATENT DOCUMENTS 8,397,932 B2    3/2013    Ichikawa et al.
8,714,401 B2    5/2014    Ichikawa et al.
(Continued)

FOREIGN PATENT DOCUMENTS

EP    1 902 960     3/2008
JP    2005-111888   4/2005
(Continued)

OTHER PUBLICATIONS

Extended European Search Report in European Patent Application No. 13770269.2, dated Aug. 3, 2015.
(Continued)

*Primary Examiner* — Yan Lan
(74) *Attorney, Agent, or Firm* — Greenblum & Bernstein, P.L.C.

(57) ABSTRACT

A stretched and foamed plastic formed body forming, in at least a portion thereof, a foamed region which incorporates foamed cells therein, wherein the foamed cells have a flat shape with a maximum thickness of not more than 30 μm and an average aspect ratio of not less than 4 as viewed in cross section of the formed body perpendicular to a direction in which the formed body is stretched to a maximum degree, and a non-foamed plastic skin layer having no foamed cell distributed therein is formed on the outer surface of the
(Continued)

foamed region. The formed body is, further, blended with a non-lustrous pigment as the coloring agent, which is different from a lustrous pigment such as flaky pigment, and exhibits a metal color over the foamed region thereof. The foamed formed body exhibiting a metal color and, specifically, a gold color or a silver color is thus provided without using any expensive lustrous pigment such as metal powder pigment or flaky pigment.

4 Claims, 2 Drawing Sheets

(51) Int. Cl.
*B29C 49/08* (2006.01)
*B29K 105/04* (2006.01)

(52) U.S. Cl.
CPC . *B29B 2911/14013* (2013.01); *B29K 2105/04* (2013.01); *B29K 2995/003* (2013.01); *B29K 2995/0025* (2013.01); *Y10T 428/1376* (2015.01); *Y10T 428/249975* (2015.04)

(58) Field of Classification Search
CPC ............ B29K 2995/003; B65D 1/0207; B65D 1/0215; Y10T 428/1376; Y10T 428/249975
See application file for complete search history.

(56) References Cited

U.S. PATENT DOCUMENTS

| | | |
|---|---|---|
| 2003/0105176 A1 | 6/2003 | Haas et al. |
| 2007/0218231 A1 | 9/2007 | Semersky |
| 2009/0026198 A1 | 1/2009 | Ichikawa et al. |
| 2009/0305030 A1 | 12/2009 | Sriraman et al. |
| 2010/0264052 A1* | 10/2010 | Semersky ............... B29B 11/14 206/524.6 |
| 2011/0160325 A1 | 6/2011 | Goto et al. |
| 2013/0149480 A1 | 6/2013 | Ichikawa et al. |
| 2014/0110415 A1 | 4/2014 | Ichikawa et al. |
| 2014/0183775 A1 | 7/2014 | Ichikawa et al. |
| 2014/0231426 A1 | 8/2014 | Ichikawa et al. |

FOREIGN PATENT DOCUMENTS

| | | |
|---|---|---|
| JP | 2007-22554 | 2/2007 |
| JP | 2007022554 | * 2/2007 |
| JP | 2007-320082 | 12/2007 |
| JP | 2009-530205 | 8/2009 |
| JP | 2009-262366 | 11/2009 |
| WO | 2007/007867 | 1/2007 |
| WO | 2010/095623 | 8/2010 |

OTHER PUBLICATIONS

U.S. Appl. No. 14/395,660 to Hiroki Iino et al., filed Oct. 20, 2014.
Search report from International Patent Appl. No. PCT/JP2013/055832, mail date is Apr. 16, 2013.

* cited by examiner

STRETCHED AND FOAMED PLASTIC FORMED BODY HAVING APPEARANCE OF A METAL COLOR

TECHNICAL FIELD

This invention relates to a stretched and foamed plastic formed body having appearance of a metal color. More specifically, the invention relates to a stretched and foamed plastic bottle having a foamed region in at least the body portion thereof and exhibiting appearance of a metal color (specifically, a gold color or a silver color).

BACKGROUND ART

Containers of a polyester as represented by polyethylene terephthalate (PET) feature excellent properties such as transparency, heat resistance, gas-barrier property and the like properties, and have nowadays been extensively used for a variety kinds of applications.

In recent years, on the other hand, it is a mounting demand to reutilize the resources inclusive of the above polyester containers. Therefore, attempts have been made to recover the used containers and to reuse them as the recycled resin for various applications.

Here, many of the contents contained in the packing containers are subject to be degraded with light, as represented by some kinds of beverages, medicines, cosmetics and the like. Therefore, these kinds of contents are provided being contained in opaque containers that are formed by using a resin composition of a resin blended with a coloring agent such as pigment. From the standpoint of reutilizing the resources, however, the opaque containers are not desirable since they are blended with coloring agents. In order to impart impart light-shielding property (opaqueness) without using coloring agent, therefore, the present applicant has previously previously proposed foamed bottles having a container wall that is foamed by utilizing a microcellular technology (see, for example, patent documents 1 to 3).

PRIOR ART DOCUMENTS

Patent Documents

Patent document 1: JP-A-2007-022554
Patent document 2: JP-A-2007-320082
Patent document 3: JP-A-2009-262366

OUTLINE OF THE INVENTION

Problems that the Invention is to Solve

As described above, the so-called foamed bottles were developed on a prerequisite that they were not blended with any coloring agent, and almost nothing has hitherto been studied concerning the colors of the foamed bottles blended with the coloring agent.

Concerning the foamed bottles, however, the present inventors have conducted a lot of experiments and have discovered the fact that if the foamed bottles blended with a coloring agent were produced by utilizing the microcellular technology, then there can be obtained the foamed bottles having appearance of a metal color and, specifically, a gold color or a silver color without really using a lustrous pigment such as expensive flaky pigment.

It is, therefore, an object of the present invention to provide a foamed formed body such as a bottle exhibiting a metal color and, specifically, a gold color or a silver color without using an expensive lustrous pigment or flaky pigment.

Means for Solving the Problems

According to the present invention, there is provided a stretched and foamed plastic formed body forming, in at least a portion thereof, a foamed region which incorporates foamed cells therein, wherein:

the foamed cells have a flat shape with a maximum thickness of not more than 100 μm and an average aspect ratio of not less than 4 as viewed in cross section of the formed body perpendicular to a direction in which the formed body is stretched to a maximum degree;

a non-foamed plastic skin layer having no foamed cell distributed therein is formed on the outer surface of the foamed region; and the formed body is blended with a non-lustrous pigment as the coloring agent, and exhibits a metal color over the framed region thereof.

In the stretched and foamed plastic formed body of the present invention, it is desired that:

(1) The plastic skin layer has a thickness of 1 to 50 μm;
(2) An orange to green type pigment is used as the coloring agent to exhibit a gold color;
(3) A black type pigment is used as the coloring agent to exhibit a silver color; and
(4) The stretched and foamed plastic formed body has the shape of a bottle, and at least the body portion of the bottle is forming the foamed region.

EFFECTS OF THE INVENTION

The stretched and foamed plastic formed body of the present invention has its greatest feature in the formation of a number of fine foamed cells of a flat shape by utilizing the microcellular technology enabling the stretched and foamed plastic formed body to exhibit appearance of a gold color even without using a lustrous pigment as the coloring agent but using an ordinary inexpensive non-lustrous pigment as the coloring agent and, besides, even without forming, on the surface thereof, a particular film such as metal-deposited film that exhibits a metal color. This makes it possible to improve decorative property of the stretched and foamed plastic formed body very inexpensively and, therefore, to improve its commercial value.

Here, the foaming by the microcellular technology is an art of forming foamed cells by causing the resin to imbibe an inert gas as the foaming agent, and growing the gas into bubbles, and gives such an advantage that the foamed cells are small and are homogeneously distributed over the whole body as well as an advantage that physical properties such as strength and the like are little deteriorated by the foamed cells.

In the invention, in particular, the stretched and foamed plastic formed body having appearance of a gold color or a silver color can be obtained by suitably selecting a coloring agent that is to be used under a condition where there is used, as the coloring agent, a non-lustrous pigment that is different from the lustrous pigment such as flaky pigment. This embodiment enables the decorative property to be exhibited to a maximum degree, and is the optimum embodiment of the present invention.

MODES FOR CARRYING OUT THE INVENTION

Figure 1:
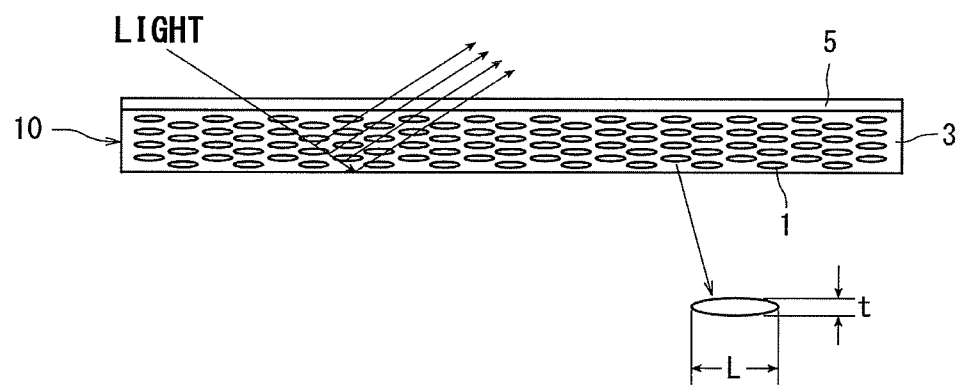
FIG. 1 is a side sectional view of a foamed region of a stretched and foamed plastic formed body of the present invention in a direction in which it is stretched to a maximum degree.

Referring to FIG. 1 which is a sectional view of the formed region of the stretched and foamed plastic formed body of the invention (vertical cross section in the direction of a maximum stretch), a number of foamed cells 1 of a flat shape are contained and distributed in the foamed region of the formed body generally designated at 10. Here, since the plastic material forming a matrix 3 has been stretched, the foamed cells 1 all assume a flat shape being stretched to be the longest in the direction of a maximum stretch.

Usually, a metallic appearance is realized by using many metal powder pigments such as copper powder, aluminum powder, zinc powder, gold powder and silver powder, or flaky pigment such as mica, flaky titanium or flaky stainless steel, or a pigment (bright pigment) obtained by coating the surfaces of such flaky pigment with fine metal particles such as of cobalt, nickel or titanium (hereinafter these pigments are often called lustrous pigments or metallic pigments), or by using these pigments in combination with pigments of other colors. The present invention, however, develops a metal color without using the above lustrous pigments, but using other coloring agent (non-lustrous pigment) and foamed cells 1. It is, therefore, necessary that the flat foamed cells 1 have a maximum thickness t of not more than 100 μm, preferably, not more than 50 μm or, more preferably, not more than 30 μm, have an average aspect ratio of not less than 4 and, preferably, in a range of 6 to 30 and, further, that a non-foamed thin plastic skin layer 5 containing no foamed cell 1 is formed on the outer surface side thereof.

Here, as will be understood from FIG. 1, if a maximum length of a flat foamed cell 1 (length in the direction of maximum stretch) is denoted by L, the aspect ratio is expressed as L/t (where t is the thickness of the cell 1).

That is, light-shielding property is imparted by small flat foamed cells 1 and by the coloring agent added to the matrix 3, while regular reflection, multiple reflection, scattering of light and interference of light are caused by the surface of the smooth skin layer 5 (e.g., an average surface roughness Ra (JIS B 0601) of not more than 10 μm) and by the flat foamed cells 1 and, at the same time, a manicuring effect is attained by the skin layer 5 (refractive index of light is constant on the surface) and a color is produced by the coloring agent. As a result, appearance of a lustrous metal color is exhibited.

In the invention, in particular, the amount of reflection increases with an increase in the number of foamed cells 1 and with an increase in the cell diameter (maximum length of the foamed cells 1), i.e., the formed body 10 appears to be bright. Conversely, the reflection of light decreases with a decrease in the number of the foamed cells 1 and with a decrease in the cell diameter (maximum length of the foamed cells 1), and the formed body 10 appears to be dark.

Further, as the maximum thickness of the foamed cells 1 increases and the aspect ratio decreases, the regular reflection decreases, irregular reflection becomes conspicuous, and the luster decreases.

Further, as the skin layer 5 becomes thick, the manicuring effect becomes conspicuous and a dense color develops. As the skin layer 5 becomes thin, the manicuring effect becomes faint and color develops faintly.

According to the invention, therefore, the size of the flat foamed cells 1 is maintained to lie in a specific range due to the average thickness t and the aspect ratio (L/t). Upon adjusting the number of the bubbles and the thickness of the skin layer 5 to lie in predetermined ranges depending on the color and the amount of the coloring agent that is used, therefore, it is allowed to obtain appearance of a desired metal color.

To obtain appearance of a metal color, for example, the flat foamed cells 1 of the above-mentioned size may be formed in a number to impart the light-shielding property to such a degree that a total light transmission factor is not more than 40% and, specifically, is not more than 20%. Here, the total light transmission factor may be measured at such a wavelength with which the coloring agent that is added shows no activity, i.e., with which the absorption coefficient a is 0.

Further, the coloring agent other than the above-mentioned metallic pigments is used in an amount of, usually, 5 to 0.0005 parts by weight and, specifically, 3 to 0.001 part by weight per 100 parts by weight of the plastic material forming the formed body 10 (matrix 3).

By utilizing a relationship among the number of bubbles, the thickness of the skin layer 5 and the color, further, the invention can develop the most highly decorative gold color or silver color by using a non-lustrous pigment of a suitable color as the coloring agent creating the greatest advantage of the present invention.

In the invention, for example, it is allowed to use the pigments of various colors as coloring agents except the above-mentioned lustrous pigments. Despite the coloring agent of any color is used, a metal color corresponding to the above color can be exhibited being added up with luster due to scattering of light, reflection, interference and manicuring effect. When it is attempted to obtain the gold color, in particular, there is used an orange to green type non-metallic pigment and when it is attempted to obtain the silver color, there is used a black type pigment which is a non-lustrous pigment.

As concrete examples of the orange to green type non-metallic pigments, there can be described the following compounds though not limited thereto only. The pigments of these colors can be selectively used in one kind or in a combination of two or more kinds depending on the use of the formed bodies.

Orange Pigments:

Chrome orange, molybdenum orange, permanent orange GTR, Pyrazolone Orange, Vulcan Orange, Indanthrene Brilliant Orange RK, Benzidine Orange G, Indanthrene Brilliant Orange GK.

Red Pigments:

Red iron, cadmium red, red lead, cadmium mercury sulfide, permanent red 4R, Lithol Red, Pyrazolone Red, Watching Red Calcium Salt, Lake Red D, Brilliant Carmine 6B, eosine lake, Rhodamine Lake B, alizarin lake, Brilliant Carmine 3B.

Violet Pigments:
  Manganese violet, Fast Violet B, methyl violet lake.
Blue Pigments:
  Prussian blue, cobalt blue, alkali blue lake, Victoria Blue Lake, phthalocyanine blue, metal-free phthalocyanine blue, partly chlorinated product of phthalocyanine blue, Fast Sky Blue, Indanthrene Blue BC.
Green Pigments:
  Chrome green, chrome oxide, Pigment Green B, Malachite Green Lake, Final Yellow Green G.

Carbon black is a representative example of the black pigment that is used for obtaining silver color. An iron pigment such as iron oxide is a non-lustrous pigment though it is a metal powder pigment, and can also be used in the invention.

Among the pigments of the above colors, it is desired to use the pigments in such a combination that when a non-foamed body is formed, a value $a^*$ in the $L^*a^*b^*$ color model is in a range of 20 to −20, a value $b^*$ is in a range of 40 to −5, and a value L is not more than 90 and is, specifically, in a range of 80 to 50. For example, in a bottle that will be described later, it is desired that the value $b^*$ and the value $L^*$ are in the after-mentioned ranges in the mouth portion (neck portion) which is the non-foamed region.

Further, to obtain a vivid and clear gold color or silver color, it is desired that the density of the foamed cells 1 in the foamed region is in a range of $10^5$ to $10^8$ cells/cm$^3$ and the thickness of the skin layer 5 is in a range of 1 to 20 µm.

In the present invention, the density of the foamed cells 1 (number of cells) and the thickness of the skin layer 5 are selected in addition to selecting the kind and amount of the coloring agent to thereby express vivid and clear gold color or silver color.

For example, there can be expressed gold colors of the Pantone Color Samples Nos. 871C, 872C, 873C, 874C, 875C, 876C, 8384C, 8385C, 8580C, 8581C, 8582C, 8640C, 8641C, 8642C, 8643C, 8644C, 8645C, 8940C, 8660C, 8960C and 8961C.

Further, there can be expressed silver colors of the Pantone Color Samples Nos. 877C, 8001C, 8400C, 8401C, 8402C, 8403C, 8404C, 8405C, 8420C, 8421C, 8422C, 8423C, 8424C and 8425C.

As the plastic material (forming the matrix 3) used for forming the stretched and foamed plastic formed body 10, there can be used any known thermoplastic resin without any specific limitation so far as it can imbibe an inert gas that will be described later and can be foamed by the microcellular technology. For instance, the formed body 10 can be formed by using an olefin resin such as low-density polyethylene, high-density polyethylene, polypropylene, poly 1-butene, poly 4-methyl-1-pentene, random or block copolymer of α-olefins such as propylene, 1-butene, 4-methyl-1-pentene, or cyclic olefin copolymer; ethylene vinyl copolymer such as ethylene vinyl acetate copolymer, ethylene vinyl alcohol copolymer or ethylene vinyl chloride copolymer; styrene resin such as polystyrene, acrylonitrile styrene copolymer, ABS or α-methylstyrene-styrene copolymer; vinyl resin such as polyvinyl chloride, polyvinylidene chloride, vinyl chloride vinylidene chloride copolymer, methyl polyacrylate or methyl polymethacrylate; polyamide resin such as nylon 6, nylon 6-6, nylon 6-10, nylon 11 or nylon 12; polyester resin such as polyethylene terephthalate, polybutylene terephthalate, polyethylene naphthalate or copolymerized polyester thereof; polycarbonate resin; polyphenylene oxide resin; or biodegradable resin such as polylactic acid. The formed body 10 may be formed by using a blend of these thermoplastic resins, as a matter of course.

It is most desired that the stretched and foamed plastic formed body 10 of the present invention is used as a packing container and, specifically, as a plastic bottle exhibiting the above-mentioned metal color and, specifically, gold color or silver color over the foamed region. That is, the plastic bottle having appearance of a metal color and, specifically, a gold color or a silver color could not be inexpensively produced so far and, therefore, had not so far been produced. The present invention, however, made it possible to produce the above plastic bottle without using expensive metallic pigment permitting its decorative property to be exhibited to a maximum degree.

Figure 2:
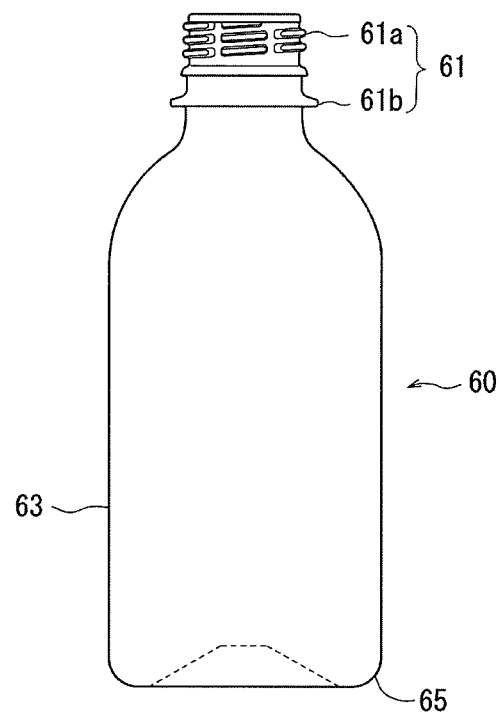
FIG. 2 is a view showing a bottle which is a representative example of the stretched and foamed plastic formed body of the invention.

FIG. 2 shows an example of the plastic bottle of this kind.

In FIG. 2, the bottle generally designated at 60 includes a bottom portion 65 and a body portion 63. At the upper end of the body portion is formed a neck portion 61 having a threaded portion 61a and a support ring 61b. In this bottle 60, the bottom portion 65 and the body portion 63 are forming a foamed region where the above-mentioned foamed cells 1 are present, the foamed region having light-shielding property and exhibiting the above-mentioned metal color. On the other hand, the mouth portion and the neighboring neck portion 61 are forming a non-foamed region where there is no foamed cell. Therefore, the neck portion 61 has a large strength and excellent dimensional stability enabling itself to be reliably screw-engaged with the cap over the threaded portion 61a and, further, ensuring a transport by holding the support ring 61b.

The plastic bottle 60 is favorably formed by using an olefin resin or a polyester resin. Specifically, the polyester resins such as polyethylene terephthalate and the like are best suited for forming the bottle 60 of the above-mentioned kind.

<Production of the Stretched and Foamed Plastic Formed Body>

The stretched and foamed plastic formed body of the invention that exhibits a metal color and, specifically, a gold color or a silver color over the foamed region, can be produced relying upon the known methods (e.g., patent documents 1 to 3 and WO2009/119549) which were proposed so far by the present applicant except blending the plastic material with a coloring agent other than the above-mentioned pigments, kneading and forming them together, and adjusting the forming conditions such as the amount of inert gas that is imbibed, foaming condition and stretching condition so that the sizes of the foamed cells and the thickness of the skin layer lie in predetermined ranges.

The stretched and foamed plastic formed body of the shape of a bottle or the like can be obtained by, for example, preparing a preform in which an inert gas that serves as a foaming agent (e.g., nitrogen gas or carbonic acid gas) is dissolved (step of preparing a gas-imbibed preform), permitting the inert gas to be partly released from the surface of the preform (step of releasing gas), selectively heating a portion that becomes the foamed region of the formed body that will be finally obtained to obtain a foamed preform (step of foaming), and finally subjecting the thus obtained foamed preform to the stretch-forming.

In the step of preparing the gas-imbibed preform, the preform can be obtained from a molten and kneaded product (resin composition for forming) of the above-mentioned thermoplastic resin and the coloring agent of a predetermined amount through a known forming means such as extrusion forming, injection forming or compression forming. Here, the inert gas can be imbibed (dissolved) by placing the formed preform in an inert gas atmosphere of a high pressure being heated or not being heated. If the temperature is high, the gas dissolves in small amounts but is imbibed at an increased rate. If the temperature is low, on the other hand, the gas dissolves in large amounts but requires extended periods of time for being imbibed.

It is, further, allowable to obtain the preform imbibing the inert gas by feeding the inert gas with a pressure into the melting/kneading portion of the forming machine, and subjecting the resin composition in which the inert gas has been dissolved directly to the forming such as injection forming. In this case, to obtain the preform free of defective appearance such as swirl marks by preventing foaming in the injection-forming machine, it is desired that the resin composition dissolving the inert gas therein is injection-formed while maintaining a high pressure in the mold cavity as proposed by the present applicant in, for example, WO2009/119549, etc.

The gas-imbibing preform thus obtained is taken out from the mold in a state of being cooled and solidified. In the step of releasing gas, the gas-imbibing preform is placed under normal pressure (atmospheric pressure) for a predetermined period of time to let the inert gas released from the surface thereof. On the surface of the preform is, therefore, formed a thin skin layer in which no inert gas is dissolved or in which the inert gas concentration is low, the skin layer corresponding to the non-foamed plastic skin layer 5 of the formed body 10. Therefore, the thickness of the skin layer 5 can be adjusted depending on the time in which the preform is placed under the atmospheric pressure (or, substantially, depending on the time until the foaming by heating is executed next time).

Here, the skin layer 5 may be formed on only the outer surface of a portion that becomes the foamed region and does not have to be formed over the whole surfaces of the preform. Therefore, the gas can be selectively released from only the outer surface of the portion that becomes the foamed region by employing such means as permitting only the portion that becomes the foamed region to be exposed to the atmosphere but covering other portions so will not to be exposed to the atmosphere.

In the step of foaming conducted following the release of gas, the portion that becomes the foamed region of the formed body 10 is selectively heated, whereby the inert gas expands to generate cells which then grow; i.e., foaming is accomplished. The heating temperature for foaming is not lower than a glass transition point (Tg) of the resin, but must be lower than a melting point of the resin from the standpoint of preventing the preform from being thermally deformed. The higher the heating temperature and the longer the heating time, the larger the size and number of the cells that are formed. By utilizing this, therefore, it is made possible to adjust the density of the cells and the size of the cells.

Figure 3:
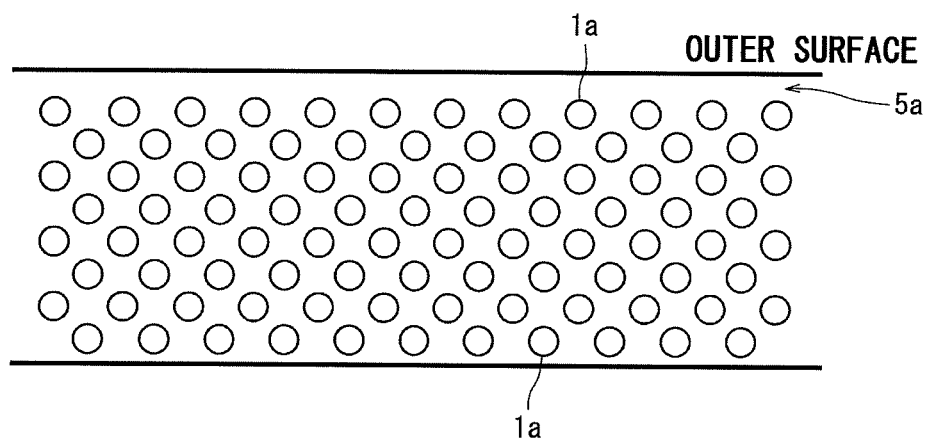
FIG. 3 is a sectional view of the foamed region of a preform used for the production of the stretched and foamed plastic formed body of the invention.

There is thus obtained a foamed preform having a foamed region where foamed cells are distributed. Referring to FIG. 3, a number of foamed cells 1a are formed in the foamed region of the foamed preform, and on the outer surface side thereof is formed a non-foamed layer 5a that corresponds to the skin layer 5 that is finally formed.

As will be understood from FIG. 3, the foamed preform has not been stretched and, therefore, the foamed cells 1a are assuming a nearly spherical shape without being flattened. Therefore, the foamed region of the foamed preform in which the cells are assuming the spherical shape, reflects light irregularly, develops a whitish color, lacks luster, and is not still capable of exhibiting a metal color.

In the present invention, the above foamed preform is stretched to obtain the foamed body 10 containing flat foamed cells 1a having the average thickness t and the aspect ratio as described above. Specifically, to obtain the foamed preform that exhibits a gold color or a silver color, it is desired that the amount of gas dissolved and the foaming condition (heating temperature) are so adjusted as to attain, for example, a density of spherically foamed cells 1a of about $1 \times 10^5$ to $1 \times 10^8$ cells/cm$^3$, an average diameter (diameter of a circle) of about 5 to about 50 μm and a total light ray transmission factor of not more than 30%. That is, upon stretching the thus foamed preform in the next step, there is obtained the stretched and foamed formed body 10 that exhibits a gold color or a silver color.

Here, the heating for foaming is selectively conducted for the portion that becomes the foamed region by external heating such as blowing the hot air or by using an infrared heater, or by dipping in an oil bath.

Figure 4:
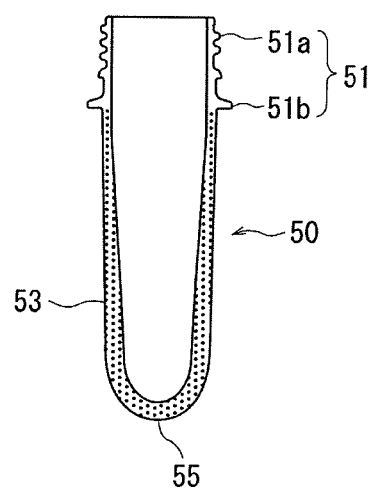
FIG. 4 is a view showing a container preform for producing the bottle of FIG. 2.

FIG. 4, for example, shows the shape of a preform for obtaining the foamed bottle 60 of FIG. 2. The preform 50 as a whole has the shape of a test tube, and is forming, at an upper part thereof, a neck portion 51 including a thread 51a and a support ring 51b and is, further, forming, under the neck portion 51, a body portion 53 and a bottom portion 55. That is, in the foamed bottle 60 of FIG. 2, the neck portion 61 having the thread 61a and the support ring 61b is a non-foamed region. Therefore, the neck portion 51 of the preform 50, too, is the non-foamed region while the body portion 53 and the bottom portion 55 are forming the foamed region which, upon being selectively heated as described above, forms foamed cells 1a of the above-mentioned spherical shape.

If it is desired to form the foamed region over the whole formed body 10, then the foamed preform as a whole may be heated.

The foamed preform is stretched by a known method, such as blow forming by heating the preform at a temperature not lower than the glass transition temperature of the resin but lower than the melting point thereof or by the vacuum forming as represented by plug assist forming. The desired stretched and foamed formed body 10 is thus obtained.

That is, when the bottle of the form shown in FIG. 2 is to be produced, the foamed preform of the shape of a test tube shown in FIG. 4 is prepared and is subjected to the blow forming. When the container of the shape of a cup is to be produced, then the foamed preform of the shape of a plate or a sheet (the bottom portion and the central portion corresponding to the body portion are forming the foamed region) may be subjected to the plug assist forming.

The foamed preform is stretched at a suitable ratio depending on the diameter and density of the foamed cells 1a in the foamed preform so that the thickness t and the aspect ratio of the foamed cells 1 lie in the above-mentioned ranges in cross section in, for example, the direction of a maximum stretch. In the blow forming that executes the stretching in the biaxial directions, i.e., in the axial direction (direction of height) and in the circumferential direction, a maximum stretch is attained, usually, in the axial direction. Therefore, the stretching ratio is adjusted in the axial direction to form flat foamed cells 1 having the above-mentioned thickness t and the aspect ratio and thereby to form the skin layer 5 having a suitable thickness. In the plug assist forming which executes the stretching in one direction or in the axial direction, the maximum stretching is attained in the axial direction, and the stretching is executed by so adjusting the stretching ratio that the flat formed cells 1 and the skin layer 5 are formed in the same manner as described above.

The thus obtained foamed and stretched plastic formed body (e.g., bottle, film, sheet, injection-formed article, etc.) exhibits a metal color over the foamed region and features highly decorative appearance despite it is blended with none of expensive lustrous pigments but is blended with an inexpensive non-lustrous pigment as the coloring agent. Specifically, the bottle exhibiting a gold color or a silver color features decorative appearance to a maximum degree owing to its high degree of appeal. Further, the light-shielding property enables the bottle to be effectively used for containing contents that are subject to be degraded by light. Besides, formation of the foamed cells gives advantages from the standpoint of reduced weight and heat-insulating property, too.

EXAMPLES

The invention will now be described by the following Experimental Examples. Here, the present invention can be adapted to the foamed and stretched plastic formed articles, in general, but is not limited to the following Examples only.

Example 1

A PET resin (intrinsic viscosity: 0.84 dl/g) for bottle of an amount of 100 parts by weight was dry-blended with 3 parts by weight of a colored master batch for brown PET resin which comprises red and green organic pigments, and the mixture was fed into an injection-forming machine.

Further, a nitrogen gas was fed in an amount of 0.15% by weight through the middle of the heating cylinder of the injection-forming machine, and was kneaded with the PET resin so as to be dissolved therein. In order to suppress the foaming in the mold, the pressure in the mold had been elevated in advance with the air (pressure in the mold, 5 MPa) and while adjusting the pressure therein so will not to permit the foaming (pressure of 60 MPa for 22 seconds until injected), the PET resin in which the nitrogen gas has been dissolved was injected into the mold, and was cooled and solidified to obtain a preform of the shape of a test tube for obtaining a container. The preform was imbibing the gas but was substantially in a non-foamed state.

The above preform exhibited a brown color, contained no foamed cell, and its weight reduction ratio was 0% as compared to when no foaming gas was added thereto.

Next, the body portion of the preform except the mouth portion was heated by using an infrared heater and was foamed. Immediately thereafter, the preform was blow-formed to obtain a foamed bottle having a capacity of about 500 ml.

The obtained bottle as a whole exhibited luster of a gold color except the mouth portion, and presented excellent appearance and concealing property. When compared to the Pantone Color Samples, the color of 8385C had been developed.

By using a scanning electron microscope (SEM), the body portion of the bottle was observed across the cross section thereof in a direction perpendicular to the up-and-down direction of the bottle to find the formation of a number of fine and flat cells. The bubbles possessed a maximum thickness of 32 μm and an average aspect ratio of 11.2. The surface layer included a skin layer quite free of bubbles, and the thickness of the skin layer was 2 μm.

The body portion of the bottle was partly cut out and was incinerated in an electric oven maintained at 550° C. for a whole day and night to make sure that the residue was not more than 10 ppm and there was left no inorganic pigment residue such as metal powder pigment or flaky pigment.

Comparative Example 1

A bottle was formed in the same manner as in Example 1 but adding no nitrogen gas into the heating cylinder of the injection-forming machine. The obtained bottle exhibited a clear brown color, formed no bubble, possessed poor concealing property and poor luster, and could not develop metal color.

Example 2

A bottle was formed in the same manner as in Example 1 but conducting the blow forming after one week has passed from the formation of the preform.

The obtained bottle as a whole exhibited luster of a gold color except the mouth portion, and possessed excellent appearance and concealing property. When compared to the Pantone Color Samples, the color of 8642C had been developed.

By using the SEM, the body portion of the bottle was observed across the cross section thereof to find that the bubbles possessed a maximum thickness of 28 μm and an average aspect ratio of 10.9 and that the thickness of the skin layer was 19 μm.

Example 3

A bottle was formed in the same manner as in Example 1 but adding the colored master batch in an amount of 1 part by weight.

The obtained bottle as a whole exhibited bright luster of a gold color except the mouth portion, and possessed excellent appearance and concealing property. When compared to the Pantone Color Samples, the color of 467C had been developed.

By using the SEM, the body portion of the bottle was observed across the cross section thereof to find that the bubbles possessed a maximum thickness of 27 μm and an average aspect ratio of 11.2 and that the thickness of the skin layer was 3 μm.

Example 4

A bottle was formed in the same manner as in Example 1 but adding the nitrogen gas in an amount of 0.12% by weight into the heating cylinder of the injection-forming machine.

The obtained bottle as a whole exhibited a dark gold color except the mouth portion, and possessed excellent appearance. When compared to the Pantone Color Samples, the color of 462C had been developed. By using the SEM, the body portion of the bottle was observed across the cross section thereof to find that the bubbles possessed a maximum thickness of 21 μm and an average aspect ratio of 10.5 and that the thickness of the skin layer was 4 μm.

Comparative Example 2

A bottle was formed in the same manner as in Example 1 but adding the nitrogen gas in an amount of 0.20% by weight into the heating cylinder of the injection-forming machine. The preform obtained in the stage of injection contained many fine bubbles. The bottle obtained by blowing the preform as a whole, except the mouth portion, exhibited a faint yellow color without luster and could not develop a metal color.

When compared to the Pantone Color Samples, the color of 486C had been developed. By using the SEM, the body portion of the bottle was observed across the cross section thereof to find that the bubbles possessed a maximum thickness of 62 μm and an average aspect ratio of 10.4 and that the thickness of the skin layer was 2 μm.

Comparative Example 3

A PET resin (intrinsic viscosity: 0.84 dl/g) for bottle of an amount of 100 parts by weight was dry-blended with 3 parts by weight of a colored master batch for brown PET resin used in Example 1, and the mixture was fed into the injection-forming machine. Further, the nitrogen gas was fed in an amount of 0.15% by weight through the middle of the heating cylinder of the injection-forming machine, and was kneaded with the PET resin so as to be dissolved therein. In order to suppress the foaming in the mold, the pressure in the mold had been elevated in advance with the air (pressure in the mold, 5 MPa) and while adjusting the pressure therein so will not to permit the foaming (pressure of 55 MPa for 19 seconds until injected), the PET resin in which the nitrogen gas has been dissolved was injected into the mold, and was cooled and solidified to obtain an injection-formed plate (thickness of 1.5 mm). The injection-formed plate was imbibing the gas but was substantially in a non-foamed state.

Next, the obtained injection-formed plate was heated by using an oven of the type of blowing the hot air to obtain a foamed injection-formed plate. The obtained foamed injection-formed plate exhibited an ocher color with concealing property, but possessed no luster and could not develop a metal color.

By using the SEM, the formed plate was observed across the cross section thereof to find that fine spherical cells had been formed a lot having a maximum thickness of 47 μm and an average aspect ratio of 1.1.

Example 5

A PET resin of an amount of 100 parts by weight was dry-blended with 0.5 parts by weight of a colored master batch comprising carbon black for black PET resin, and the mixture was fed into the injection-forming machine where it was kneaded with 0.13% by weight of the nitrogen gas. The mixture was then injection-formed into a preform for container in a substantially non-foamed state. The obtained preform exhibited a black color but showed no foamed cell, and its weight reduction ratio was 0%.

Next, the preform was blow-formed by the same method as in Example 1 to obtain a foamed bottle having a capacity of about 500 ml. The obtained bottle as a whole exhibited luster of a silver color except the mouth portion, and possessed excellent appearance and concealing property. When compared to the Pantone Color Samples, the color of 8400C had been developed.

By using the SEM, the body portion of the bottle was observed across the cross section thereof to find that the bubbles possessed a maximum thickness of 10 μm and an average aspect ratio of 8.5 and that the thickness of the skin layer was 10 μm.

Example 6

A preform was injection-formed in the same manner as in Example 5 but adding the black master batch in an amount of 2 parts by weight. Thereafter, the preform was left to stand in the atmosphere for one month to release the gas from the surface layer. Thereafter, the preform was blow-formed into a bottle which as a whole exhibited luster of a silver color except the mouth portion and possessed excellent appearance and concealing property. When compared to the Pantone Color Samples, the color of 8403C had been developed.

By using the SEM, the body portion of the bottle was observed across the cross section thereof to find that the bubbles possessed a maximum thickness of 5.9 μm and an average aspect ratio of 9.6 and that the thickness of the skin layer was 93 μm.

DESCRIPTION OF REFERENCE NUMERALS

1: flat foamed cells
3: matrix
5: skin layer
10: stretched and foamed plastic formed body
t: thickness of foamed cell 1
L: maximum length of foamed cell 1

The invention claimed is:

1. A stretched and foamed plastic formed body forming, in at least a portion thereof, a foamed region which incorporates foamed cells therein, wherein:
   said foamed cells have a flat shape with a maximum thickness of not more than 50 μm and an average aspect ratio of not less than 4 as viewed in cross section of the formed body perpendicular to a direction in which the formed body is stretched to a maximum degree;
   a non-foamed plastic skin layer having no foamed cell distributed therein is formed on an outer surface of said foamed region;
   said formed body is blended with a non-lustrous pigment as a coloring agent, and exhibits a metal color over a foamed region thereof,
   (a) the non-lustrous pigment is present in an amount of 5 to 0.0005 parts by weight per 100 parts by weight of plastic material forming the formed body,
   (b) the formed cells have a density of $10^5$ to $10^8$ cells/cm$^3$ in the formed region, and
   (c) the skin layer formed on the outer surface and where no foamed cell is distributed, has a thickness of 1 to 20 μm.

2. The stretched and foamed plastic formed body according to claim 1, wherein an orange to green type pigment is used as said coloring agent to exhibit a gold color.

3. The stretched and foamed plastic formed body according to claim 1, wherein a black type pigment is used as said coloring agent to exhibit a silver color.

4. The stretched and foamed plastic formed body according to claim 1, wherein said stretched and foamed plastic formed body has a shape of a bottle, and at least a body portion of said bottle is forming said foamed region.

* * * * *